R. R. GOODRICH.
METHOD FOR THE HYDRO ELECTROLYTIC TREATMENT OF ORES.
APPLICATION FILED MAY 25, 1915.

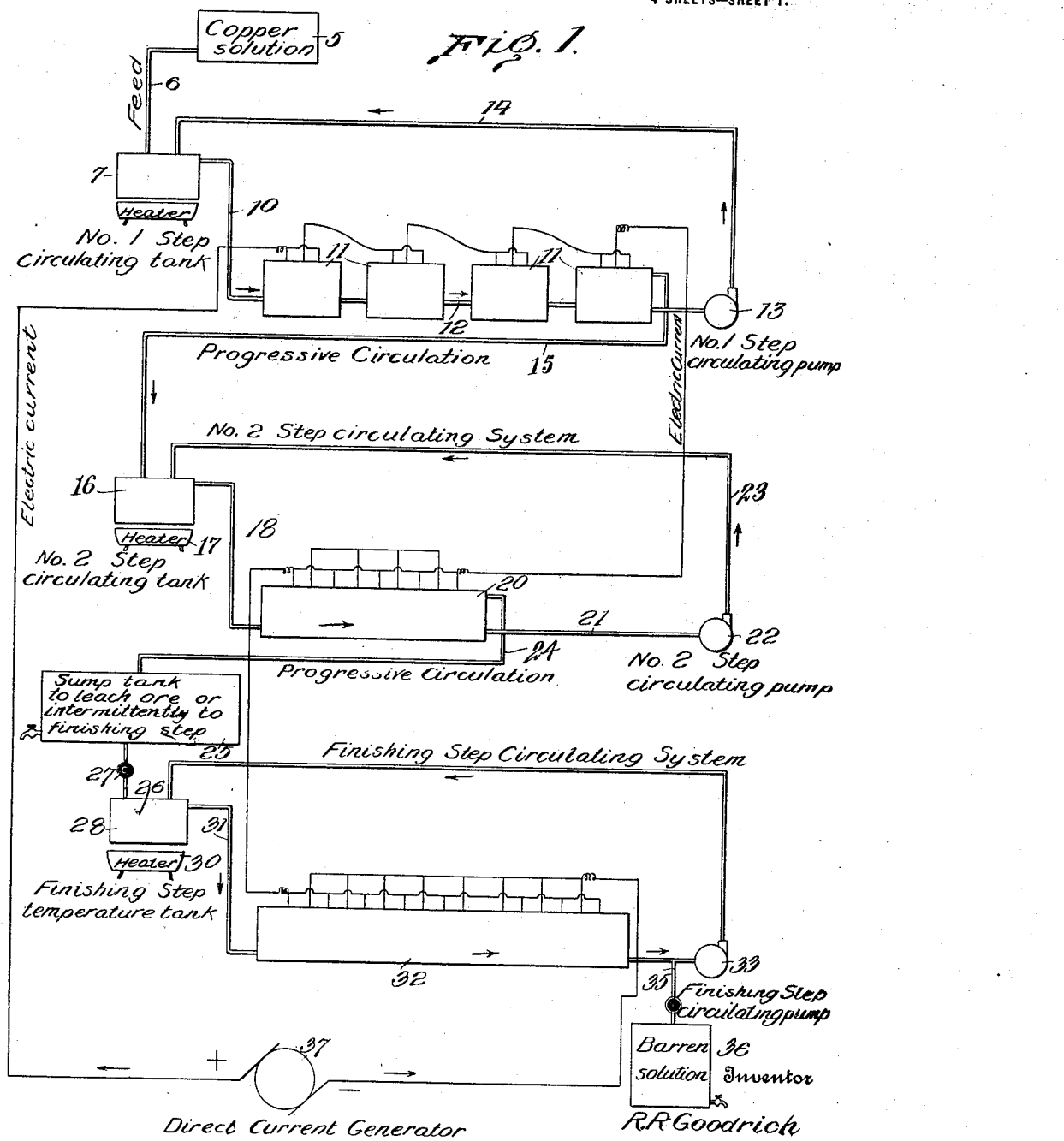

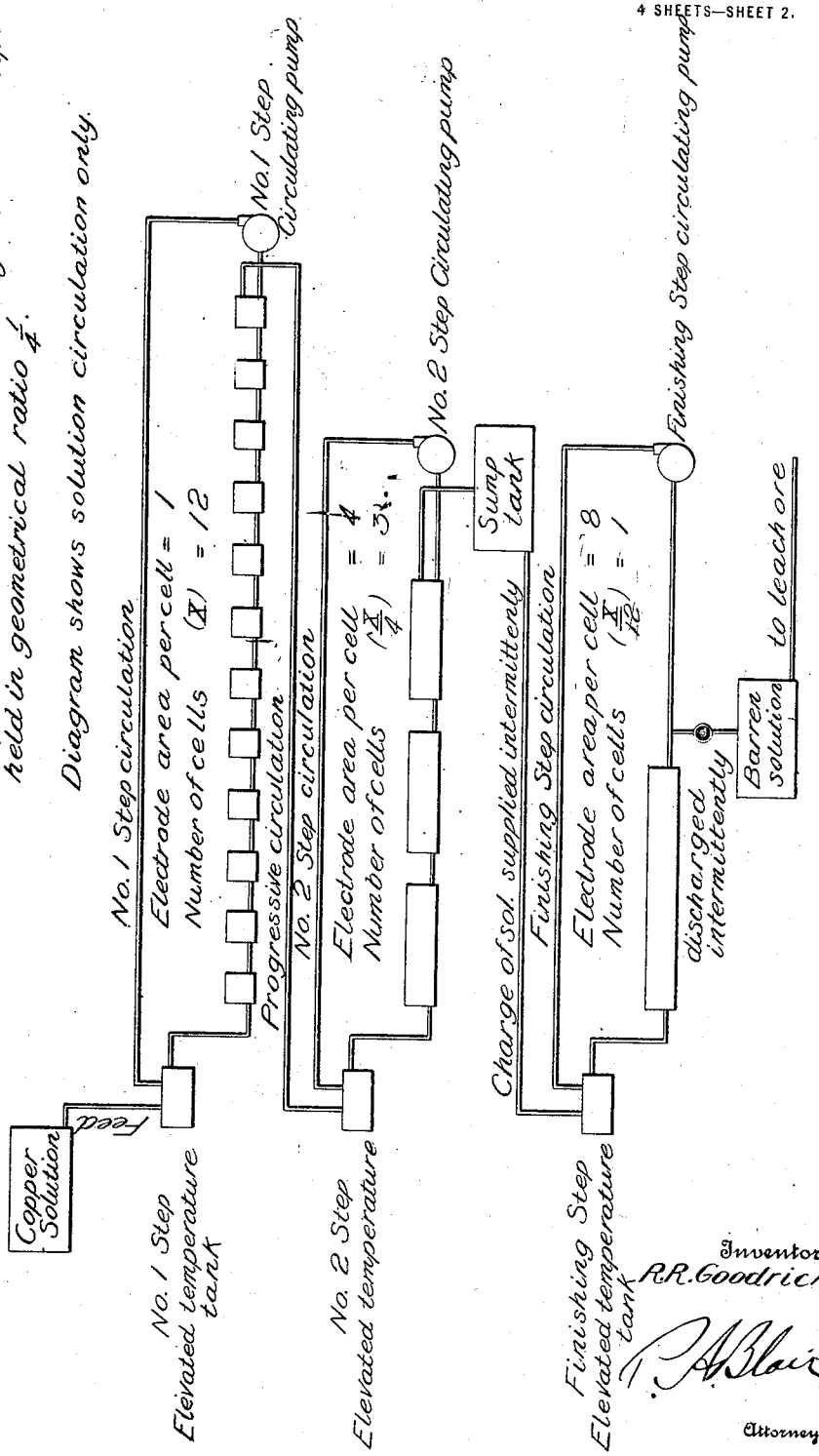

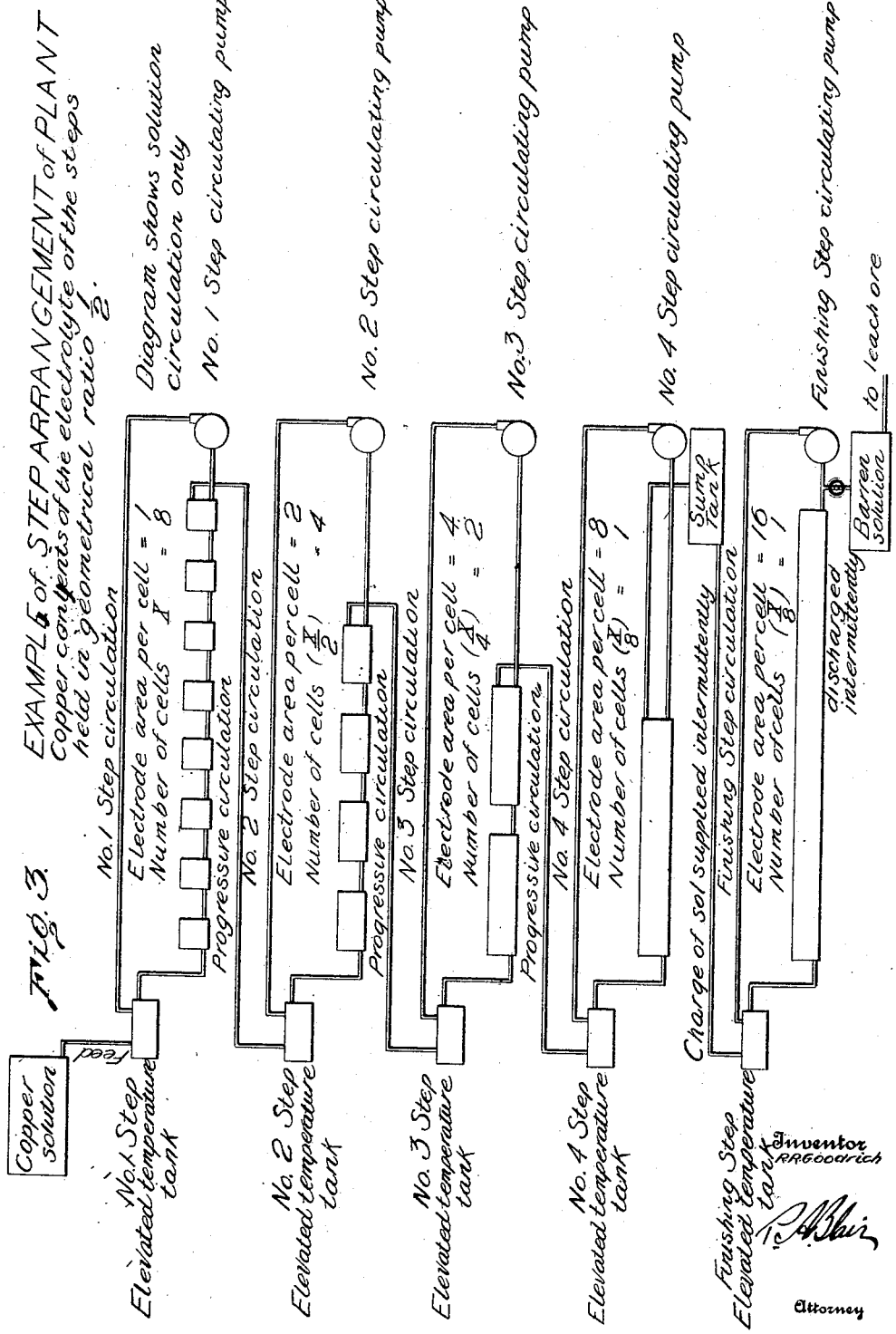

1,171,782.

Patented Feb. 15, 1916.
4 SHEETS—SHEET 4.

UNITED STATES PATENT OFFICE.

ROBERT RHEA GOODRICH, OF TUCSON, ARIZONA.

METHOD FOR THE HYDRO-ELECTROLYTIC TREATMENT OF ORES.

1,171,782.  Specification of Letters Patent.  Patented Feb. 15, 1916.

Application filed May 25, 1915. Serial No. 30,446.

*To all whom it may concern:*

Be it known that I, ROBERT RHEA GOODRICH, a citizen of the United States, residing at Tucson, in the county of Pima and State of Arizona, have invented certain new and useful Improvements in Methods for the Hydro-Electrolytic Treatment of Ores, of which the following is a specification.

This invention relates to a method of treating ores, and in its more intense aspect to a hydro-electrolytic process of treating copper ores.

One of the objects of the present invention is to provide a simple and practical process of electrolytically treating metallic ores.

Another object is to provide a highly efficient process which may be performed at a minimum amount of expense and time.

A further object is to provide a commercially practicable process for extracting the values from ores in a hydro-electrolytic manner.

A further object is to provide a process of the above character which may be carried out in steps where in each step the metal contents of the electrolyte and the current density are substantially constant.

A further object is to carry out such process with a minimum amount of power consumption.

Other objects will be in part obvious and in part hereinafter pointed out in the following detailed explanation.

The invention accordingly consists in the features of construction and combination of parts in the unique arrangement of steps and the relation of each step to each other, as will be indicated in the appended claims.

To enable others skilled in the art so fully to comprehend the underlying features thereof that they may embody the same by numerous modifications in structure and relation contemplated by this invention, drawings depicting diagrammatically several forms and arrangements of the apparatus have been annexed as part of this disclosure, and in such drawings like characters of reference denote corresponding parts throughout all the views, of which—

Figure 1 is a diagrammatic view showing the complete apparatus, with its electric connections and circulating means, so far as necessary to understand the present invention. Fig. 2 is a similar view (but with more cells) showing circulation means—but not showing electric connections. Fig. 3 is a similar view showing an apparatus with the cells arranged for a different geometrical ratio of the metal contents of the electrolyte of the different steps. Fig. 4 is a similar view showing the cells arranged to suit an arithmetical difference in metal contents of the electrolyte of the steps.

Referring now in detail to the accompanying drawings and more particularly to Fig. 1, a brief description of the apparatus shown therein will be given in order that a clearer understanding of the process hereinafter described may be had. In this drawing 5 designates a tank adapted to contain the copper solution which is supplied or filled directly from ore leaching tanks, not shown. A pipe 6 leads from the lower part of this tank to a second tank 7, which will hereinafter be referred to as No. 1 step temperature tank, which is provided with heating means 8 for maintaining the same at a substantially constant temperature of approximately 50 degrees centigrade, in order to more efficiently carry out the present process. A pipe 10 leads from this temperature tank to the first of a series of four electrolytic cells 11, connected at their lower ends by intervening pipes 12, thereby permitting a continuous passage of the electrolyte therethrough, as indicated by the arrows. The final cell of this series of four is connected with a circulating pump 13, which in turn is connected at its discharge end by means of a circulating pipe 14 for conducting the solution back to the temperature tank 7. The upper part of the end cell 11 is provided with an overflow pipe 15 adapted to convey a portion of the solution to a tank 16 hereinafter referred to as No. 2 step temperature tank, also supplied with a heating means 17. A pipe 18 is provided for conducting the solution from this temperature tank to the lower part of a single electrolytic cell 20, having four times the electrode area, as will presently be explained, of each cell 11. An outlet pipe 21 communicates with a circulating pump 22 for circulating a portion of the solution back through pipe 23 to temperature tank 16. An overflow pipe 24 conducts a portion of the solution to a sump tank 25. This solution from which a large part of the copper has been removed may be drawn off to leach further copper ores, or it may pass through a pipe 26 provided with a valve 27 into a tank 28, which may be referred to as finishing step temperature tank, being also provided with heating means 30. A pipe 31 is adapted to convey the solution from tank 28 to a still larger cell 32, provided with a circulating pump 33, for continuously circulating the solution through pipe 34 back to the finishing step temperature tank again and again until the copper is completely removed. A bypass 35 leading to a barren solution tank 36 may be provided if desired, from which the barren solution may be conducted to the ore leaching tanks. A generator 37 is provided at any convenient point and is preferably connected with the cells in substantially the manner shown. That is all of the cells are connected in series while the electrodes of each cell are connected in parallel.

The circulating pumps may be operated in any desired manner, such for example as motors directly connected therewith and not herein shown.

The apparatus shown in Figs. 2, 3 and 4 are substantially the same in general structure, electric wiring, etc., and it is believed to be unnecessary to describe these in detail. Their operation and difference in arrangement will be apparent from the description of the operation thereof and the following discussion of the process in connection therewith.

Taking up now the process adapted to be carried out in the apparatus shown in Fig. 1, it may be noted that the electrolysis of the copper sulfate solution, which may be taken as an example, resulting from the leaching of copper ores, is conducted in steps, through electrolytic cells connected in series, with the electrodes of each individual cell connected in parallel. In each step the composition of electrolyte is maintained substantially constant in both copper and acid by means of the unique arrangement of circulating systems of the electrolyte. One of these circulations may be called the step circulating or inter-stage, and comprises a circulating pump and intervening connections for drawing the electrolyte from the last cell of the step and returning it to the temperature tank which maintains the temperature of the system constant, and from which it overflows and gravitates into the first cell of the step. The other circulation may be called intra-stage system, whereby the electrolyte progresses through the plant. Here the copper solution resulting from the leaching of the ore, after passing through the cells in the first step overflows into No. 2 step temperature tank. In other words the copper solution resulting from the leaching of the ore is run, together with the discharge of the No. 1 step circulating pump 13, into the elevated temperature tank of No. 1 step, thus there enters the first cell of the step more solution than is drawn away by pump 13, and consequently the balance, of an equivalent amount of solution, leaves the last cell of the step by way of overflow pipe 15 into temperature tank 16 of No. 2 step. Finally the last cell of the step preceding the finishing step (No. 2 in this case) overflows an amount of solution equal in amount to the inflowing copper solution to temperature tank 7.

The copper contents of the electrolyte from that of the copper solution fed to No. 1 step to that of the electrolyte of the last step, excepting the finishing step, is maintained in geometrical ratio. This is accomplished by placing in series in each succeeding step a different number of cells. The number of cells of each succeeding step decreases in the same geometrical ratio as the copper contents of the electrolyte of the step, while at the same time the area of the electrode surface is adjusted so that the current density is proportional to the copper contents. Since the same current passes through every cell, the cells of the first step have a comparatively small area of electrode surface, while the cells of the last step have a much larger area.

In designing a plant, any geometric factor, such as $\frac{1}{2}$, $\frac{1}{3}$ or $\frac{1}{4}$, or arithmetical difference, may be used. For convenience, and as shown in Fig. 1, the geometric factor $\frac{1}{4}$ is used, and by way of example it may be assumed that the copper solution resulting from the leaching of the ore has a copper contents of 6.0 per cent. Then the electrolyte of No. 1 step will contain one-fourth of this copper contents, or 1.5 per cent. Let us use four cells in series each with one cathode, as shown; a suitable current density for this step is selected governed by the copper contents of the electrolyte, since it is desirable to maintain current density proportional to the copper contents of the electrolyte. This selection of current density fixes the strength of the current.

Let us select for No. 1 step: cathode area per cell=0.0824 sq. ft.; current density=20 amperes per sq. ft. Then, the current strength=0.0824×20=1.648 amperes. In No. 2 step the electrolyte has ¼ the copper contents that it had in No. 1 step. Since current density is to be held proportional to copper contents of the electrolyte, this requires to be used in No. 2 step cathode area per cell=0.0824×4=0.3296 sq. ft. Since all the cells are connected in series the same current (1.648 amperes) that passes through the cells of No. 1 step likewise passes through the cells of No. 2 step, consequently the current density in No. 2 step=

$$\frac{1.648}{3.296} = 5 \text{ amperes per sq. ft.}$$

This is what is desired. The copper solution is fed to this step (No. 1 step) at such a rate that the copper deposited on the electrodes amounts to three-fourths of the entering copper. The electrolyte circulating in the step thus remains constant in copper contents, likewise in acid, and the solution overflowing is of the same composition as the step electrolyte and in volume equal to that of the inflowing copper feed solution.

The solution fed through pipe 15 to No. 2 step contains 1.5 per cent. of copper, being the overflow of No. 1 step, but the electrolyte of No. 2 step will contain but one-fourth of this amount or 0.375 per cent., since the adjustments of the plant are such that there is deposited in No. 2 step, three-fourths of the copper fed to it. In order to maintain the electrolyte of this step constant, one-quarter as much copper must be deposited on the cathodes of this step, which may be accomplished by placing one-quarter as many cells in series, that is one cell having four cathodes, containing a cathode area of four times that of a cell in No. 1 step, since the electrolyte has one-quarter the copper strength. This may be tabulated as follows: 1. Geometric factor equals "¼." 2. Copper feed solution resulting from leaching ore of 6.0 per cent. copper contents.

|  | No. 1 step. | No. 2 step. | Finishing step. |
|---|---|---|---|
| Copper remaining in electrolyte, reported as per cent. of that in feed | 25 | 6.25 | 0 |
|  | No. 1 step only. | No. 2 step only. | Finishing step only. |
| Copper extracted, reported as per cent. of that in feed | 75 | 18.75 | 6.25 |
|  |  | Nos. 1 and 2 steps. | All steps. |
| Copper extracted total, reported as per cent. of that in feed | 75 | 93.75 | 100 |

From this table it is seen that the solution overflowing from the second step contains but 6.25% of the original copper contents, and if desired this solution in which the acid solvent has been regenerated may pass over to the ore leaching tanks. The mere fact that it contains a small amount of copper is immaterial since this copper contents will return again in the enriched copper feed solution. However, if it should be desired to extract the copper to the last trace a finishing step may be employed. This step is supplied intermittently with a charge of solution from the sump tank 25, where the solution overflowing from cell 20, No. 2 step, has collected. This charge of solution is circulated in the finishing tank continuously by a circulating pump in the same manner as in the preceding step, but with neither feed nor overflow, for a length of time depending upon the volume of electrolyte in the system, or until all of the copper contents is deposited on the cathode. The solution barren in copper may be drawn off into tank 36 when desired, after which a new charge is supplied from the sump tank through connection 26.

In order to simplify the preceding description, the question of evaporation of the electrolyte in passing through the system has been eliminated. In practical operation of the plant the values of the composition of the electrolyte will vary somewhat from geometrical ratio, depending upon the method adopted for compensating for evaporation.

It is the desideratum of metallurgists to secure in the hydroelectrolytic extraction of copper from its ores with insoluble anodes, conditions comparable with those which are obtained in the electrolytic refining of copper with soluble anodes. In the present process these conditions are more nearly approached than heretofore. These desirable conditions are: first, constant composition of electrolyte with current density adjusted to suit composition; and second, small power consumption. The present step system arrangement accomplishes the first and, like in electrolytic refining of copper, the electrolyte may be circulated at any desired rate. A rapid rate of circulation is made possible in the present system, together with the adjusting of the current density proportional to the copper contents, which is held constant in each step and makes possible the securing of high current efficiency.

Increased areas of electrodes to give reduced current density for corresponding depletion in copper contents of the solution in process of electrolysis, have been used heretofore. In these processes, however, there may be found but one circulation of the electrolyte, namely, that through the plant progressively; the solution becomes depleted of the copper during its passage. Such a circulation would be necessarily slow and insufficient for the securing of the best results. Moreover the electrolyte, due to the slow progress through the cells, would vary in composition in different parts. So although in these processes the aim has been to maintain the current density proportional to the copper contents, it has not really been accomplished.

The arrangements of the plant are such that: 1. Rapid circulation is maintained by the step circulating system. 2. The composition of electrolyte remains constant in each step of the system. 3. The current density is held strictly proportional to the copper contents.

In the arrangement shown in Fig. 2 of the drawings, the same geometrical ratio is employed, but with a different number of cells in each step, from the example shown in Fig. 1. The finishing cell of the finishing step in the apparatus shown in Fig. 1 will, in four hours, extract all the copper from the solution supplied in twelve hours by the overflow of No. 2 step. If however, the plant is arranged as shown in Fig. 2, with three times as many cells as in No. 1 and No. 2 steps, the volume of copper solution fed to No. 1 step would have been three times as large, and likewise the overflow of No. 2 step would have been three times as large. The one cell of the finishing step would therefore be obliged to operate continually in order to keep up its work.

The following tabulated disclosure of operation and results attained by the arrangement shown in Fig. 2 may be most conveniently set forth as follows:

Example of step arrangement of plant. Composition of the electrolytes of the steps held in geometrical ratio $\frac{1}{4}$, (except the finishing step.)

|  | Feed copper solution. | No. 1 step. | No. 2 step. | Finishing step. |
|---|---|---|---|---|
| Relative copper contents of electrolyte | 1 | $\frac{1}{4}$ | $\frac{1}{16}$ | $\frac{1}{16}$ to 0 |
| Copper contents of electrolyte, per cent | 6.0 | 1.5 | 0.375 | 0.375 to 0 |
| H$_2$SO$_4$ contents of electrolyte per cent | 0 | 6.93 | 8.66 | 8.66 to 9.21 |
| Copper remaining in electrolyte expressed as per cent. of that in feed |  | 25 | 6.25 | 0 |
| Copper deposited, expressed as per cent. of that in feed |  | 75 | 18.75 | 6.25 |
|  |  |  | (Nos. 1 and 2 steps.) | (All steps.) |
| Total copper deposited expressed as per cent. of that in feed |  | 75 | 93.75 | 100 |
| Number of cells in series in each step |  | X | $\frac{X}{4}$ | $\frac{X}{12}$ |
| Relative electrode area per cell |  | 1 | 4 | 8 |
| Relative current density |  | 1 | $\frac{1}{4}$ | $\frac{1}{8}$ |

N. B. When using carbon anodes with sulfur dioxid gas, acid contents will be higher than given in these samples.

In Fig. 3 there is shown diagrammatically an apparatus which in general structure is substantially the same as that shown in Fig. 1, the cells are connected in series and the electrodes of the individual cells connected in parallel. The number of cells however in each step is different and further steps are added. The copper contents of the electrolyte of the steps is maintained in geometrical ratio $\frac{1}{2}$, likewise the number of cells of the succeeding steps is maintained in the same geometrical ratio, while the electrode area per cell of each step is double the electrode area per cell of the preceding step. Thus the copper contents of the electrolyte of each step is maintained constant and the current density is maintained proportional to the copper contents of the electrolyte.

This arrangement and operation may be tabulated as follows:

Example of step arrangement of plant. Composition of the electrolytes of the steps held in geometrical ratio $\frac{1}{2}$, (except the finishing step.)

|  | Feed copper solution. | No. 1 step. | No. 2 step. | No. 3 step. | No. 4 step. | Finishing step. |
|---|---|---|---|---|---|---|
| Relative copper contents of electrolyte | 1 | $\frac{1}{2}$ | $\frac{1}{4}$ | $\frac{1}{8}$ | $\frac{1}{16}$ | $\frac{1}{16}$ to 0 |
| Copper contents of electrolyte, per cent | 6.0 | 3.0 | 1.5 | 0.75 | 0.375 | 0.375 to 0 |
| H$_2$SO$_4$ contents of electrolyte, per cent | 0 | 4.62 | 6.93 | 8.08 | 8.66 | 8.66 to 9.24 |
| Copper remaining in electrolyte, expressed as per cent. of that in feed |  | 50 | 25 | 12.5 | 6.25 | 0 |
| Copper deposited, expressed as per cent. of that in feed |  | 50 | 25 | 12.5 | 6.25 | 6.25 |
|  |  |  | (Nos. 1 and 2 steps.) | (Nos. 1, 2, and 3 steps.) | (Nos. 1, 2, 3, and 4 steps.) | (All steps.) |
| Total copper deposited, expressed as per cent. of that in feed |  | 50 | 75 | 87.5 | 93.75 | 100 |
| Number of cells in series of each step |  | X | $\frac{X}{2}$ | $\frac{X}{4}$ | $\frac{X}{8}$ | $\frac{X}{8}$ |
| Relative electrode area per cell |  | 1 | 2 | 4 | 8 | 16 |
| Relative current density |  | 1 | $\frac{1}{2}$ | $\frac{1}{4}$ | $\frac{1}{8}$ |  |

In Fig. 4 there is shown a further form of apparatus in which the copper contents of the electrolyte of the steps are maintained in arithmetical difference of 1.5. The number of cells in each step remains the same but the electrode area of each cell is increased so that the current density is maintained proportional to the copper contents of the electrolyte. The operation and results attained by this arrangement may be tabulated as follows:

*Example of step arrangement of plant. Composition of the electrolytes of the steps held in arithmetical difference, 1.5 per cent., (except the finishing step.)*

|  | Feed copper solution. | No. 1 step. | No. 2 step. | No. 3 step. | Finishing step. |
|---|---|---|---|---|---|
| Relative copper contents of electrolyte | 1 |  |  |  |  |
| Copper contents of electrolyte, per cent | 6.0 | 4.5 | 3.0 | 1.5 | 1.5 to 0 |
| H$_2$SO$_4$ contents of electrolyte, per cent | 0 | 2.31 | 4.62 | 6.93 | 6.93 to 9.24 |
| Copper remaining in electrolyte, expressed as per cent. of that in feed |  | 75 | 50 | 25 | 0 |
| Copper deposited, expressed as per cent. of that in feed |  | 25 | 25 (Nos. 1 and 2 steps.) | 25 (Nos. 1, 2, and 3 steps.) | 25 (All steps.) |
| Total copper deposited, expressed as per cent. of that in feed |  | 25 | 50 | 75 | 100 |
| Number of cells in series in each step |  | X | X | X | X |
| Relative electrode area per cell |  | 1 | 1.5 | 3 | 6 |
| Relative current density |  | 1 | $\frac{1}{1.5}$ | $\frac{1}{3}$ | $\frac{1}{6}$ |

From the above disclosure it will be seen that the present invention comprises a simple and practical apparatus so arranged and proportioned as to permit the carrying out of the process herein disclosed in a manner designed to accomplish, among others, all of the objects and advantages above set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim—

1. The herein described method of depositing a metal electrolytically by maintaining a circulation throughout an entire system of cells while simultaneously causing an independent circulation of electrolyte in each of a number of groups of cells.

2. The herein described method of depositing a metal electrolytically by maintaining a circulation throughout the entire system of cells while simultaneously causing an independent circulation of electrolyte in each of a number of groups of cells, and maintaining the composition of an electrolyte constant during its circulation in each group.

3. The herein described method of depositing a metal electrolytically by maintaining a circulation throughout the entire system of cells while simultaneously causing an independent circulation of electrolyte to each of a number of groups of cells provided with different electrode surface areas in each group.

4. The herein described method of depositing a metal electrolytically by maintaining a circulation throughout the entire system of cells while simultaneously causing an independent circulation of electrolyte in each of a number of groups of cells provided with increasing electrode surface, said first circulation maintaining an inflow of solution to each group suitable to the current strength thereof.

5. The herein described method of depositing a metal electrolytically by maintaining a circulation throughout the entire system of cells in which the electrodes of the groups of cells of each are connected in series and the electrodes of each cell are connected in parallel while simultaneously causing an independent circulation of electrolyte in each group of cells.

6. The herein described method of depositing a metal electrolytically which consists in step grouping cells of increasing electrode area, maintaining constant the composition of electrolyte in each group and simultaneously causing inter and intra circulation in said groups.

7. The herein described method of depositing a metal electrolytically by maintaining a circulation throughout the entire system of cells in which the electrolytic density is maintained proportional to the metallic content of the electrolyte while simultaneously causing an independent circulation of electrolyte in each of a number of groups of cells.

8. The herein described method of depositing a metal electrolytically by maintaining a circulation throughout the entire system of cells having series connected electrodes and simultaneously causing an independent circulation of electrolyte in each of a number of groups of cells having progressively increasing electrode surface area.

9. The herein described method of depositing a metal electrolytically by maintaining a circulation throughout the entire system of cells while simultaneously causing an independent circulation of electrolyte in each of a number of groups of cells and heating the electrolyte prior to its passage into each group of cells.

10. The herein described method of depositing a metal electrolytically by maintaining a circulation throughout the entire system of cells arranged in groups of gradually increasing electrode area, maintaining a flow of solution between adjacent groups suitable to the current strength, and maintaining the composition of electrolyte in each group substantially constant by means of a simultaneous and independent circulation of electrolyte in each group of cells.

In testimony whereof I affix my signature in presence of two witnesses.

ROBERT RHEA GOODRICH.

Witnesses:
ANNA BLACK,
JOHN J. RANAGAN.